Dec. 30, 1969  G. HEITMANN  3,486,883
PROCESS FOR THE PRODUCTION OF IRON SPONGE
Filed Oct. 6, 1965

INVENTOR
Günter Heitmann
BY
ATTORNEYS 3,486,883
PROCESS FOR THE PRODUCTION OF IRON SPONGE
Günter Heitmann, Frankfurt am Main, Niederrad, Germany, assignor to Metallgesellschaft Aktiengesellschaft, Frankfurt am Main, Germany and The Steel Company of Canada Limited, Hamilton, Ontario, Canada
Filed Oct. 6, 1965, Ser. No. 493,393
Claims priority, application Germany, Oct. 9, 1964, M 62,709
Int. Cl. C21b 13/14
U.S. Cl. 75—33        8 Claims

ABSTRACT OF THE DISCLOSURE

Green iron ore pellets are directly reduced in a rotary kiln by introducing them onto a bed of carbonaceous material having a temperature of at least 700° C. and below the melting point of the pellets. The pellets are quickly heat hardened during a temperature rise of at least 25° C. per minute.

---

Figure 1:
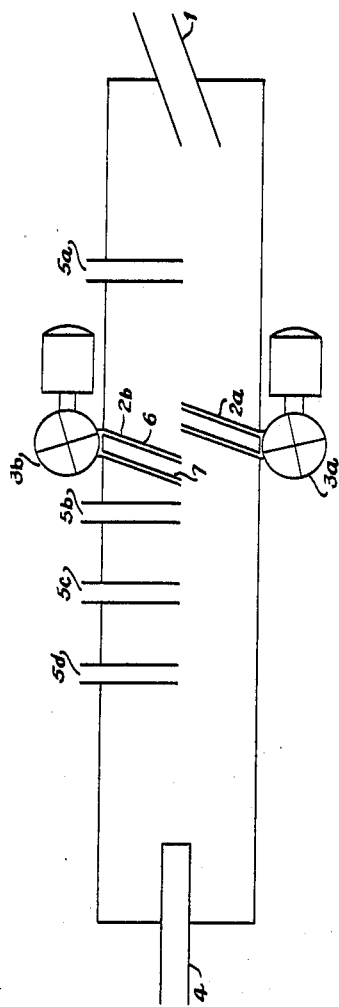

It is known to produce sponge iron in lump form by a direct reduction of pellets of oxidic iron ores in a rotary kiln with the aid of solid carbonaceous reducing agents. The pellets of iron ore may be charged, e.g., in the form of a hard-fired, carbon-free pellets into a bed of the carbonaceous reducing agent.

It has also been proposed to reduce coal-ore briquettes in a solid state, without fusion, with the aid of reducing agents and to supply the entire heat which is required in the process by solid granular heat carriers which are reheated and recirculated. In this process, lump ore, sinter and hardened pellets are considered equivalent to the briquettes. This process has not been successful in practice because the use of solid heat carriers for supplying the entire heat which is required involves great disadvantages and apparatus expenditure. For instance, the heat carrier must be heated to the maximum temperature of the process before it enters the kiln and a very high ratio of heat carrier to processed material is required. The apparatus suggested for this process and the instructions how it can be carried out involve the use of a plurality of shaft furnaces and reheating furnaces and of complicated rotary kilns of complicated design and the heating of the heat carrier to about 1200° C. before it is charged into the kilns, and an addition of heat carrier at a rate which is three times the charging rate of the material being processed.

It has also been suggested to charge green pellets rather than hard-fired pellets into the reducing kiln. Green pellets are obtained by a shaping of the fine-grained ore together with water, possibly with an addition of strength-increasing admixtures such as bentonite, hydrated lime or the like, on a pelletizing plate or a nodulizing drum without further heat treatment.

A disadvantage of this process resides in that the green strength of ore pellets is much lower than the strength of hard-fired pellets so that a substantial amount of fines is obtained by attrition in the reducing kiln. Besides, the dry strength of pellets of some ores is even lower than their green strength so that green pellets made from such ore would virtually entirely disintegrate in the reducing kiln before they have been hardened by the heat in the kiln. This applies particularly to pellets made from hematite ores whereas pellets made from magnetite ores have a much higher green strength and particularly a much higher dry strength. With magnetite ores, the drop in strength from the green state to the dry state is much less than with hematite ores and in many cases this drop in strength equals zero and if there is such drop it can be entirely compensated by strengthen-increasing admixtures in reasonable quantities, such as an addition of 0.5–1% bentonite.

On the other hand, strength-increasing admixtures in pellets of pure hematite ores in technologically and economically acceptable amounts, up to about 3%, do not have a sufficiently strong influence on the amount of fines that are produced.

The green and dry strengths of pellets made from magnetite ores too are so much lower than their strength in a hard-fired state that about 50% of the pellets made from magnetite ore disintegrate to fines during a direct reduction in the rotary kiln. In this statement, the particles below 3 mm. are defined as fines whereas the particles having a size between 3 mm. and the original size of the pellets are defined as pellet fragments. It will be understood that the production of fines in an amount of 50% is intolerable not only from the economical aspect but also technologically because it results in substantial disturbances in the process and endangers the success of the process. The production of fines in the processing of pellets made from magnetite ores may be reduced to about 20% by an admixture of about 0.5% bentonite.

It has now been found that the disintegration of moist green pellets made from magnetite ore to fines during the reduction to form sponge iron can be substantially restricted if the temperature rise to which said pellets are subjected is carried out at a much higher rate than before. In the known processes, the kiln charge and with it the iron ore pellets are heated at a rate of about 8–15° C. per minute to the hardening temperature of about 900° C., the invention teaches to effect a temperature rise at a rate of at least 25° C. per minute, preferably 30–50° C. per minute. The hardening temperature is considered that temperature at which the consolidation of the pellets by the formation of metallic iron takes place at a sufficiently high speed so that the pellets can no longer be abraded thereafter in the process by mechanical stress. According to the invention, this high rate of temperature rise is obtained and even exceeded in that the moist green pellets are charged to the rotary kiln which has been charged with the solid carbonaceous reducing agent and, if desired, with sulfur-combining admixtures, is supplied with the moist green pellets at a point where the previously charged materials have already reached a temperature of at least 700° C., preferably at least 900° C. or above.

In the processing of moist green pellets made from magnetite ore, this step alone is sufficient to reduce the production of fines during the reduction to a large extent, e.g., from about 50% to about 25%. The increased rate of temperature rise is preferably combined with the known admixture of about 0.5% bentonite during pelletizing. This results in a decrease of the production of fines during the reduction to less than 10%.

A further preferred step is to bond caking coal into the pellets instead of or in combination with the admixture of bentonite. The amount in which coal is admixed is selected in accordance with the desired residual carbon content in the sponge iron. The addition of caking coal may amount to as much as 40%, preferably 15–30%.

The step according to the invention to use an increased rate of temperature rise is not sufficient alone, however, to prevent an excessive disintegration of green pellets made from hematite ore, even when bentonite or similar binders are admixed. Even with an admixture of bentonite in an amount of 3%, which is approximately the upper limit that is technologically and economically acceptable, the production of fines with a normal rate of temperature rise (8–15° C. per minute) is in excess of 50% and at a rate of temperature rise of 50° C. per minute is still about 35%.

When the high rate of temperature rise adopted according to the invention is combined with other steps, the amount of fines that are produced in the processing of pellets made from hematite ore can be reduced to acceptable values. These other steps are, selectively:

(a) Bonding of caking coal into the pellets during pelletizing;

(b) Bonding sponge iron, which has been produced in the process, into the pellets during pelletizing is an amount of up to about 25%, preferably about 10%;

(c) Admixing magnetite ore in sufficiently large amounts, of at least 20%, preferably about 40%, during pelletizing.

Instead of magnetite ore, other ore may be used which increases the abrasive strength and/or the shock temperature of the pellets, such as certain lateritic ores. The admixture of such ores amounts to at least 20%, preferably 40–50%.

Steps (a) to (c) may be selectively adopted either alone or in combination and, if desired, in conjunction with other steps, known per se, for increasing the strength, such as an addition of hydrated lime. The rapid temperature rise according to the invention is applicable to green pellets with or without a content of bonded coal.

The bonding of coal, particularly of caking coal, into pellets made from hematite or magnetite ore or concentrates thereof has the further advantage that the intimate mixture in which the ore and reducing agent are presented results in a reduction of the iron oxides at a very high rate even at relatively low temperatures. For instance, pellets containing 20% bonded caking coal have been virtually completely reduced by a reducing treatment at 1000° C. during one hour. In the usual reducing process using only an external bed of solid reducing agents at the same temperature, twice this time is required for a complete reduction at the same temperature. Besides, the bonded coal results at temperatures of 1100° C. to 1200° C. in a rapid carburization of the resulting sponge iron so that the softening point of the iron particles in the pellets is reduced and an increased bonding of the particles by fusing and fritting is effected. This results in pellets having a very high strength and density.

A bonding of coal into the pellets will always be desirable when a high degree of reduction, a high output and a high strength and density are essential. On the other hand, the pellets subjected to the reducing process suitably contain no bonded coal when it is desired to produce sponge iron pellets which are free of gangue and contain a minimum of sulfur because when pellets are used which contain bonded coal the ashes of the coal will remain in the pellets and will increase the gangue content thereof.

In the processing of pellets which contain bonded coal, the production of fines may be substantially reduced according to the invention if the ore-coal pellets are heated at a high rate to about 400–500° C. by charging them into the hot part of the rotary kiln charged with coal and, if desired, with sulfur-combining admixtures. In this range of 400–500° C., the caking coal assumes a plastic state. The pellets can then be heated further at a lower rate of temperature rise so that the average rate of temperature rise to the hardening temperature may be less than 25° C. per minute.

In a preferred embodiment of the invention, the fines which have been produced during the reduction and have been enriched with the contaminations of the coal and of the admixtures are classified in known manner, preferably by grinding and subsequent flotation or magnetic separation, to recover the pure sponge iron. Part of the sponge iron which has thus been recovered may be added as a strength-increasing admixture to the green pellets of the next charge if this is required. The admixture is effected in amounts up to 25%, preferably 5–10%. The rest is suitably pelletized with caking coal and is recirculated into the kiln for hardening.

In this specification and the appended claims, the water content of the green pellets is within the usual range, generally between about 8% to 12%, and depends on the nature of the materials contained in the pellets and on the method used for pelletizing.

Further in this specification and the appended claims, the proportion of admixtures contained in the pellets is based on the dry weight of the pellets.

In Examples 1 to 5, a hematite ore having the following composition was used:

| | Percent |
|---|---|
| Total Fe | 68.9 |
| P | 0.018 |
| $SiO_2$ | 0.68 |
| $Al_2O_3$ | 0.44 |
| Ignition loss | 0.23 |

This ore was ground to a fineness corresponding to a Blaine number of 1860 and the following screen analysis:

| | Percent |
|---|---|
| Less than 0.032 mm. | 93.0 |
| 0.04–0.032 mm. | 5.6 |
| 0.06–0.04 mm. | 0.8 |
| 0.09–0.06 mm. | 0.4 |
| More than 0.09 mm. | 0.2 |

For examples 6 and 7, a magnetite concentrate having the following composition was used:

| | Percent |
|---|---|
| Total Fe | 66.0 |
| $Fe^{2+}$ | 21.6 |
| $SiO_2$ | 6.8 |
| Mn | 0.08 |
| P | 0.03 |
| CaO | <0.1 |
| MgO | 0.7 |
| $Al_2O_3$ | 0.2 |
| S | 0.11 |

This ore was ground to the following particle size distribution:

| Particle size range (mm.): | Proportion percent by weight |
|---|---|
| More than 0.09 | 10.0 |
| 0.06–0.09 | 13.6 |
| 0.04–0.06 | 18.2 |
| 0.032–0.04 | 12.6 |
| Less than 0.032 | 45.6 |
| | 100.0 |

The coal used in Examples 4, 6 and 7 had the following immediate analysis:

| | Percent by weight |
|---|---|
| Moisture | 0.8 |
| Ash (750° C.) | 5.9 |
| Fixed carbon | 66.8 |
| Volatiles | 26.5 |

The Damm caking number was 17. The softening point of the coal ash under reducing conditions was found to be 1060° C.

In all examples, pellets 10–15 mm. were made from the ore with or without the admixtures stated hereinafter. 85% of these pellets had a diameter of 12–15 mm. and a water content of 9–10%.

Figure 2:
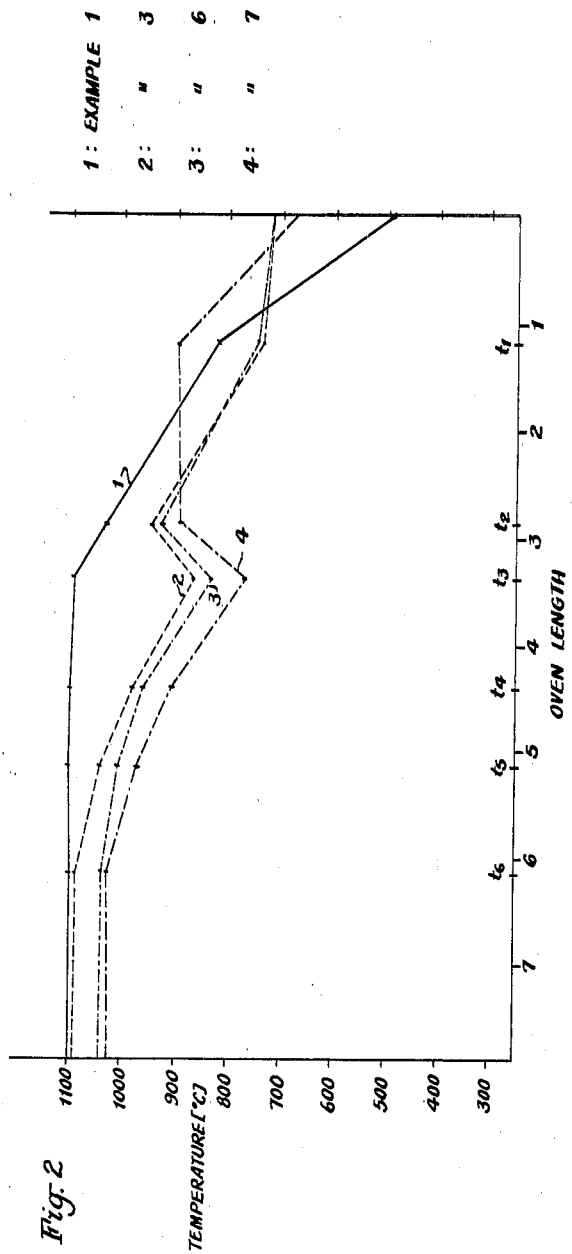

The means by which the objects of this invention are obtained are described more fully with reference to the accompanying drawings in which:

FIG. 1 is a schematic front view of a rotary kiln in which the method of this invention can be used; and FIG. 2 is a plot of curves showing the temperatures along the length of the kiln of FIG. 1, and includes a table relating the curve number to the specific example number in this application.

The rotary kiln which is shown in FIG. 1 was used for the tests. It was provided at its charging end with a feeder 1 and with two further feeders 2a and 2b, which comprised pocket wheel locks 3a and 3b. These further feeders were provided about one third of the length of the kiln from its upper end. At the discharge end of the kiln, provision was made for blowing in coal having a high gas content, as well as air, through a central feedpipe 4. The coal had a content of 57.79% $C_{fix}$, 37.27% volatile constituents, balance ash. Besides, the kiln was provided with four shell burners 5a to 5d for introducing combustion air alone or a fuel-air mixture. The shell feeders 2a and 2b were also designed as air inlet means. As is apparent from FIG. 1, the feeder consisted of a coaxial double pipe. The pellets were charged into the kiln through the inner pipe 7. Combustion air at a metered rate was injected through the outer pipe.

Temperature measuring instruments t1 to t4 were provided at the feeding end of the kiln and at three points spaced different distances from said feeding end. Provision was made for connecting said temperature measuring instruments so that they measured selectively only the bed temperatures or the temperature in the gas space. In all experiments, the rate at which coal was fed and the amount of air introduced through the shell burners were adjusted so that the temperature curves shown in FIG. 2 were obtained. In all experiments the material discharged from the kiln was cooled to 40–60° C. with exclusion of air. Then the material was screened to obtain three fractions, namely, less than 3 mm., 3–10 mm., and above 10 mm. Each of these fractions was further classified in a drum-type separator into nonmagnetic and magnetic fractions. The magnetic fraction below 3 mm. will be referred to hereinafter as pellet grit and the magnetic fraction of 3–10 mm. will be referred to as pellet fragments.

Examples of the process of the invention will be described hereinafter in comparison with Example 1, which represents the prior art. The pellets are fed to the rotary kiln through the first feeder 1 together with part of the reducing coal and the dolomite used for combining with the sulfur. Examples 2 to 7 represent the process according to the invention. In the latter examples, the pellets were fed into the kiln only by the shell feeders 2a and 2b whereas only recirculated coal from the discharged material, as reducing agent and heat transfer agent, and dolomite, for combining with sulfur, were charged through the central feeder 1.

The following table contains the most important data of the seven examples which will now be described.

PART II

| Example No. | Average heating speed of pellets, °C./min. | Magnetic Matter From Kiln Discharged | | | Degree of reduction, percent |
|---|---|---|---|---|---|
| | | Below 3 mm. | 3–10 mm. | Above 10 mm. | |
| 1 | 10 | 53 | 12 | 36 | 90 |
| 2 | 43 | 35.5 | 10.5 | 54 | 9595 |
| 3 | 42 | 9 | 1.5 | 89.5 | 95 |
| 4 | 36 | 8 | 2 | 90 | >99 |
| 5 | 55 | 7.5 | 2.3 | 90.2 | >95 |
| 6 | 30 | 5 | 3 | 92 | >99 |
| 7 | 48 | 4 | 5 | 91 | 99 |

EXAMPLE 1

(Prior art)

The pellets used in this experiment consisted only of the hematite ore with an addition of 0.5% bentonite. They were fed into the kiln only by the feeder 1 together with part of the reducing coal. The coal fed by the feeder 1 was non-caking and contained 86% $C_{fix}$, 3% volatiles, balance ash. Gas coal was blown in through the feeding pipe 4. When the equilibrium had been adjusted, the thermocouple 1 indicated a temperature of 560° C. and temperature measuring instrument 3 indicated a temperature of 1000° C. In view of the distance between these temperature measuring points, the measured temperature difference and the speed of travel of the kiln charge the average rate of temperature rise was calculated to be 10° C./min.

EXAMPLE 2

The same pellets were used as in Example 1 but after drying were fed only by the shell feeders 2a and 2b.

EXAMPLE 3

The pellets used in this experiment contained 0.5% bentonite and an admixture of sponge iron obtained in the same process. This sponge iron had a total Fe content of 92.2% and 80% of it had a particle size under 60 microns.

EXAMPLE 4

The pellets used in this experiment were made from the following mixture:

| | Parts |
|---|---|
| Ore | 100 |
| Sponge iron, total iron content, 92.2% | 10 |
| Caking coal | 15 |
| Bentonite | 5 |

The caking coal contained 72% $C_{fix}$, 23.8% volatile constituents, balance ash.

EXAMPLE 5

The pellets used in this experiment were made from a mixture of equal parts of hematite and magnetite ores.

PART I

| Example No. | Pellet Composition | Charging rate centrally fed recirculated coal, kg./h. | Green pellets | |
|---|---|---|---|---|
| | | | Centrally fed, kg./h. | Fed at shell, kg./h. |
| 1 | 0.5% bentonite | 40 | 72 | 0 |
| 2 | do | 40 | 0 | 72 |
| 3 | 100 parts hematite; 10 parts powdered iron; 0.5 part bentonite. | 40 | 0 | 81 |
| 4 | 100 parts hematite; 15 parts caking coal; 10 parts powdered iron; 0.5 part bentonite. | 36 | 0 | 102 |
| 5 | 50 parts magnetite; 50 parts hematite; 0.5 part bentonite. | 40 | 0 | 72 |
| 6 | 100 parts magnetite; 20 parts caking coal; 0.5 part bentonite. | 36 | 0 | 120 |
| 7 | 100 parts magnetite; 20 parts caking coal; 0.5 part. bentonite. | 42 | 0 | 180 |

The hematite ore was the same as that used in Examples 1 to 4. The magnetite ore had a total Fe content of 68.4%, with 22.1% bivalent Fe.

EXAMPLE 6

42 kg./h. coal and 9 kg./h. dolomite were charged into the rotary kiln through the central feeder. 120 kg./h. carbonaceous pellets were charged through the shell feeder. The temperature pattern shown in the FIG. 2 was adjusted by controlling the gas and air flow rates. The resulting sponge iron product was reduced by 99% and contained 3.6% bonded surplus coal.

EXAMPLE 7

The conditions were the same as in Example 6 but the pellet rate was increased from 120 kg./h. to 180 kg./h. The resulting sponge iron product had still a degree of reduction of 99% and a residual carbon content of 4.5%.

What is claimed is:

1. A process of hardening green iron ore pellets in a rotary kiln comprising forming green pellets formed of iron ore selected from the group consisting of hematite and magnetite, and with the pellets containing bentonite and a strength increasing additive selected from the group consisting of caking coal, sponge iron fines, magnetitic ores and lateritic ores, forming a charge containing a carbonaceous reducing agent in said kiln, and charging said green pellets into said charge where said charge has a temperature of at least 700° C. and below the melting point of any component of said charge and said pellets while said kiln is rotating, said pellets being heated and directly reduced to sponge iron in the solid state in said kiln.

2. A process as in claim 1, said green pellets composed of magnetite ore containing a strength increasing additive selected from the group consisting of caking coal and sponge iron fines.

3. A process as in claim 1, in which said green pellets contain up to 25% sponge iron fines.

4. A process as in claim 1, in which said green pellets contain up to 40% caking coal.

5. A process as in claim 1, in which said pellets contain at least 20% magnetic ore, the balance being hematite ore, said magnetic ore increasing the strength of said green pellets beyond that of comparable pellets consisting only of hematite ore.

6. A process as in claim 1, in which said green pellets are reduced to produce sponge iron pellets and sponge iron-containing fines, and in which sponge iron is separated from said fines and is admixed to said iron ore in an amount of up to 25% of the dry weight of said pellets, and residual amounts of said separated sponge iron are pelletized with caking coal.

7. A process as in claim 1, in which said green pellets are heated by said charge at a rate of at least 25° C. per minute.

8. A process as in claim 1, in which said green pellets are heated by said charge up to a temperature of 400 to 500° C. at a rate of at least 25° C. per minute and subsequently at a lower rate.

References Cited

UNITED STATES PATENTS

| | | | |
|---|---|---|---|
| 2,990,269 | 6/1961 | De Vaney | 75—5 |
| 3,034,884 | 5/1962 | Meyer et al. | 75—36 X |
| 3,197,303 | 7/1965 | Collin | 75—36 X |
| 3,235,375 | 2/1966 | Meyer et al. | 75—36 X |
| 3,238,039 | 3/1966 | Sasabe | 75—33 X |
| 3,317,308 | 5/1967 | Greffe | 75—33 |
| 3,333,951 | 8/1967 | Ban | 75—5 X |
| 3,353,952 | 11/1967 | Hansen | 75—5 X |
| 2,918,364 | 12/1959 | Lesher | 75—4 |
| 3,156,557 | 11/1964 | Dahl et al. | 75—4 |
| 3,219,436 | 11/1965 | Heitmann et al. | 75—34 |
| 3,224,871 | 12/1965 | Collin | 75—34 |
| 3,328,161 | 6/1967 | Rausch et al. | 75—33 |

HENRY W. TARRING II, Primary Examiner

U.S. Cl. X.R.

75—5, 36